United States Patent [19]
Takahashi

[11] Patent Number: 5,187,702
[45] Date of Patent: Feb. 16, 1993

[54] APPARATUS FOR MOVING AN OPTICAL SYSTEM

[75] Inventor: Naomasa Takahashi, Yokohama, Japan

[73] Assignee: Kabushiki Kaisha Toshiba, Kawasaki, Japan

[21] Appl. No.: 634,581

[22] Filed: Dec. 27, 1990

[30] Foreign Application Priority Data

Dec. 28, 1989 [JP] Japan .................................. 1-344313

[51] Int. Cl.$^5$ ..................... G11B 7/085; G11B 7/00; G02B 7/02
[52] U.S. Cl. .................... 369/215; 369/219; 369/44.15; 369/44.16; 359/823
[58] Field of Search ............... 369/215, 219, 220, 221, 369/44.14, 44.15, 44.16; 350/252

[56] References Cited

U.S. PATENT DOCUMENTS

| | | | |
|---|---|---|---|
| 4,557,564 | 12/1985 | Van Rosmalen | 369/44.15 X |
| 4,613,202 | 9/1986 | Kuriyama | 369/44.15 X |
| 4,797,866 | 1/1989 | Yoshikawa | 369/44.14 |
| 4,862,441 | 8/1989 | Yamura et al. | 369/220 X |
| 4,958,335 | 9/1990 | Takeda et al. | 369/44.14 |
| 5,001,694 | 3/1991 | Lee et al. | 369/44.16 |
| 5,018,836 | 5/1991 | Noda et al. | 369/44.16 X |

FOREIGN PATENT DOCUMENTS 61-42741 3/1986 Japan .

Primary Examiner—Stuart S. Levy
Assistant Examiner—Joseph A. Rhoa
Attorney, Agent, or Firm—Finnegan, Henderson, Farabow, Garrett and Dunner

[57] ABSTRACT

In an apparatus for moving an objective lens, the objective lens (2) mounted on a lens support is suspended on a support frame by tracking leaf springs (6) and focusing leaf springs (8), each of the tracking leaf springs (6) and each of the focusing leaf springs (8) being coupled to each other. Focusing (26a) and tracking (26b) coils are provided on the lens support and are arranged in a magnetic circuit fixed to the support frame. The support frame is movably supported on side rails and coupled to a linear motor mechanism (28). In a long-stroke access, the support frame is moved in a access signal by the linear motor mechanism along a radial direction of an optical disk. In a middle-stroke access or a tracking operation, the magnetic circuit is energized in response to the access signal or a focusing signal so that the tracking leaf spring (6) is deformed by an interaction force between a current supplied to the tracking coils (26b) and magnetic fluxes generated from the magnetic circuit. Thus, the objective lens (2) is moved along the radial direction of the disk within a middle-stroke range. In a focusing operation, the magnetic circuit is energized in response to a focusing signal so that the focusing leaf spring (8) is deformed by the interaction force. Thus, the objective lens is moved along its optical axis.

2 Claims, 8 Drawing Sheets

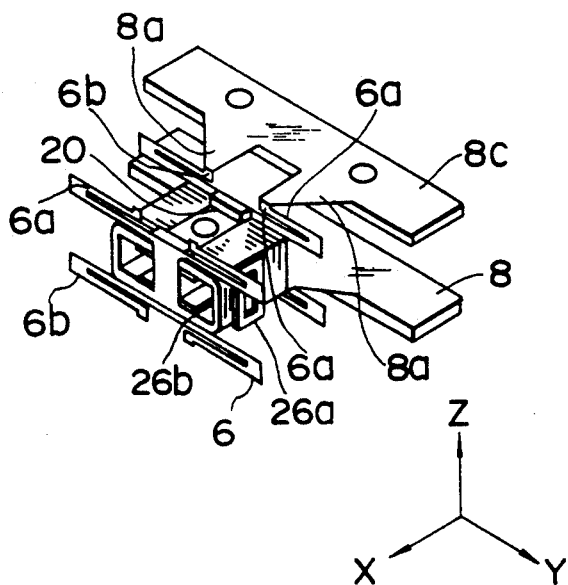
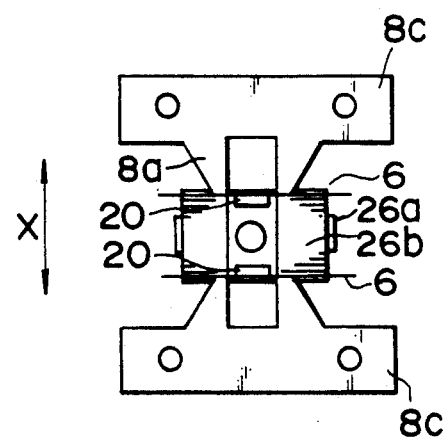
FIG. 5A
FIG. 5B
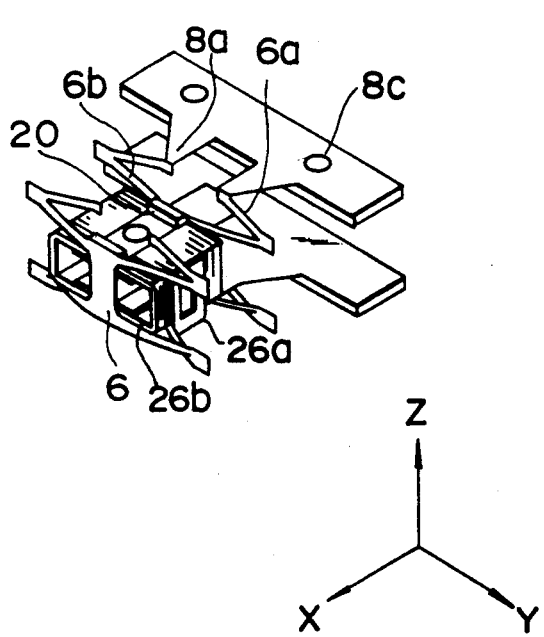
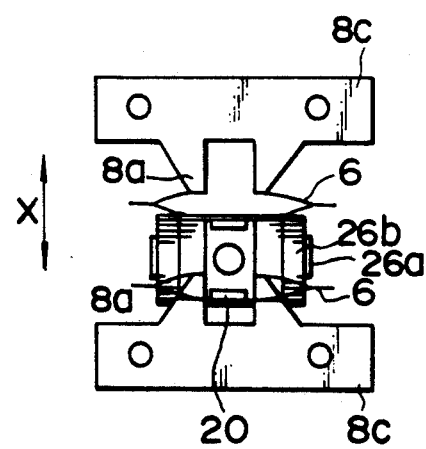
FIG. 6A
FIG. 6B

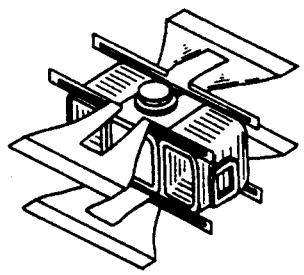
FIG. 10B
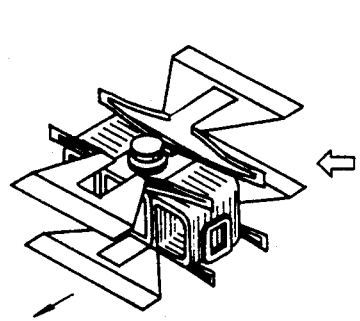 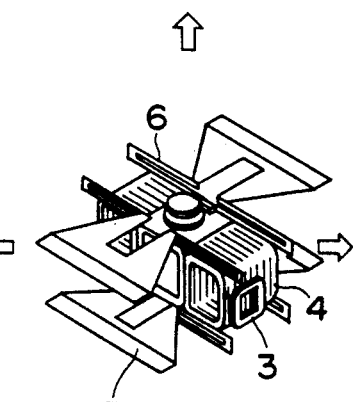 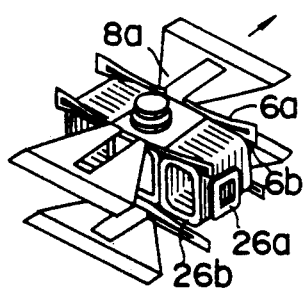
FIG. 10D    FIG. 10A    FIG. 10E
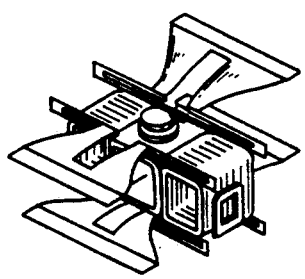
FIG. 10C F I G. 11A
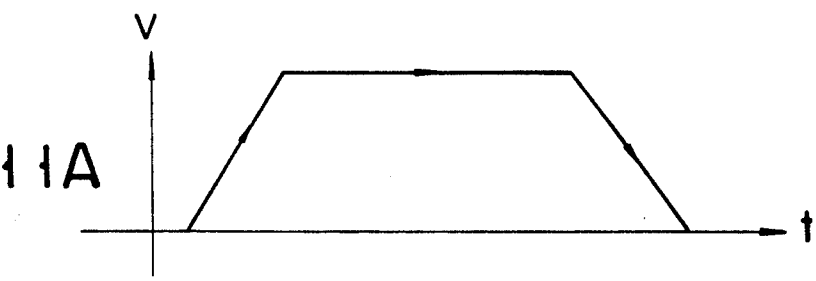
F I G. 11B
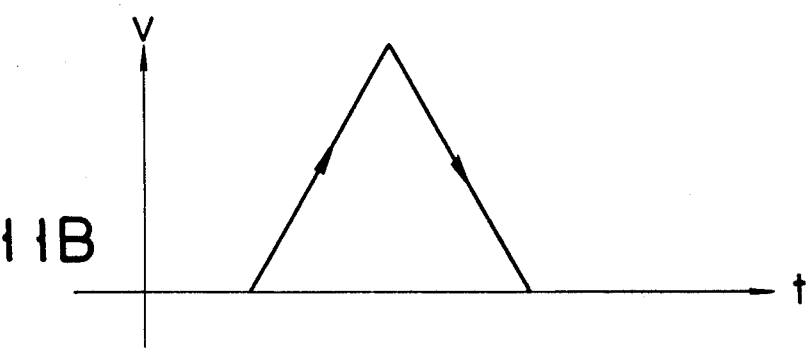
F I G. 11C
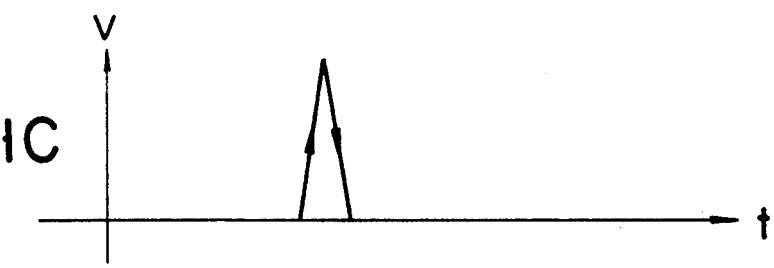

APPARATUS FOR MOVING AN OPTICAL SYSTEM

BACKGROUND OF THE INVENTION

1. Field of the Invention

The present invention relates generally to an apparatus for moving an optical system, and more particularly to an apparatus for moving an optical system built in an optical information recording/reproducing apparatus for recording information on an optical recording medium and reproducing information from the medium by radiating a light beam on the medium.

2. Description of the Related Art

FIG. 1 shows a conventional apparatus for moving an optical system. An optical head 40 for optically reproducing information from an optical recording medium (an optical disc) and for recording information on the medium comprises an optical chassis 42 containing an optical system, and an objective lens actuator 44 situated movably on the chassis 42 for directing a light beam onto the recording medium and picking up the beam from the medium. An objective lens 2 for converging a light beam onto the information recording medium is mounted on the objective lens actuator 44. The lens 2 is movable over a short distance in the focusing direction (Z-direction) by means of a focusing actuator system housed in the objective lens actuator 44, and also movable over a short distance in the traking direction (X-direction) by means of a lens actuator system housed in the objective lens actuator 44.

The chassis 42 contains an optical system comprising a guiding optical system for shaping and collimating a light beam output from a light source and transmitting the beam to the objective lens 2, and a detecting optical system for detecting the beam reflected from the optical disc. A guide bushing 46 is fixed on each of both sides of the optical chassis 42 (in FIG. 1 only the bushing on one side is shown). A guide shaft 48 extending in the tracking direction is inserted into each guide bushing 46. (In FIG. 1, part 50 where the guide shaft 48 is inserted into the bushing 46 is enlarged.) Thus, the optical head 40 is supported to be movable in the X-direction. The X-directional movement of the optical head 40 is effected by driving an arm 60 coupled to the chassis 42 by means of an electromagnetic driving system 62. The electromagnetic driving system 62 comprises a magnetic circuit 64 and a drive coil 66. The magnetic circuit 64 includes a yoke 64a and a permanent magnet 64b. The drive coil 66 is wound around the arm 60 and inserted into the magnetic circuit 64. The coil 66 is kept out of contact with the yoke 64a or permanent magnet 64b. A driving force or a Lorentz force is created on the basis of the direction of electric current flowing in the drive coil 66 and the direction of magnetic flux of the permanent magnet 64b. The driving force is applied to the optical head 40 through the arm 60, and the head 40 is moved along the guide shaft 48.

In relation to the above optical system moving apparatus, suppose that an optical recording medium (optical disc D) having a recording region with a radial length R is accessed by the objective lens 2, as is shown in FIG. 2. In general, the seek distance of the lens 2 is divided into a small-stroke distance L1, a medium-stroke distance L2 and a large-stroke distance L3. In FIG. 2, the small-stroke distance L1 corresponds to a very short seek distance (e.g. 0.3 mm or less in a general optical disc) which is almost equal to the amount of displacement of the disc D or to several track pitches. The large-stroke distance L3 corresponds to the radial length of the recording region R of the disc D, i.e. the full stroke of the head 40. The medium-stroke distance L2 corresponds to a seek distance which is between the seek distances of the small-stroke distance L1 and the large-stroke distance L3. Regarding FIG. 2, it should be noted that the strokes L1, L2 and L3 are shown only to indicate the comparison therebetween. The beginning points and end points of the small-stroke distance L1 and the medium-stroke distance L2 on the disc D are not exactly shown.

Regarding the conventional optical system moving apparatus shown in FIG. 1, when the small-stroke distance L1 is accessed, the lens actuator system is driven to move the objective lens 2. When a distance exceeding the small-stroke distance L1 is accessed, the entire body of the optical head 40 is driven by the electromagnetic drive system 62. In this apparatus, when the information recording medium D is random-accessed by the objective lens 2, the distance which is most frequently accessed is about ⅓ to 1/6 of the full stroke, in particular, about ⅓ of the large-stroke distance L3 when the optical recording medium is disk-shaped. The ⅓ of the large-stroke distance L3 corresponds to the medium-stroke distance L2. The access over this distance is carried out by the electromagnetic drive system 62 in the conventional apparatus. In this case, however, since the weight of the optical head 40 which is moved by the electromagnetic drive system 62 is heavy, the drive acceleration cannot be increased. Consequently, the access time necessary for accessing the middle-stroke distance L2 increases. In addition, it is not possible to shorten the average seek time period which is calculated by averaging seek times T1, T2 and T3 for seeking the small-, middle- and large-stroke distances L1 to L3. Because of these problems in the prior art, the increase in recording/reproducing speed with use of the optical head is limited.

SUMMARY OF THE INVENTION

The object of the present invention is to provide an apparatus for moving an optical system, wherein the drive acceleration over a frequently accessed seek distance can be increased and an average access time can be decreased.

According to this invention, there is provided an optical apparatus provided with an optical means, movable along a recording region of information recording medium, the recording region having a predetermined width in a first direction, for converging a light beam on the recording region and detecting the light beam reflected from the recording region to reproduce an information recorded on the recording region, comprising:

means for directing the light beam onto the information recording medium which is fixed and detecting the light beam reflected from the information recording medium;

means for converging the light beam on the information recording medium;

leaf springs for supporting said converging means movable along the first direction within a predetermined moving distance which is at least ⅓ of the recording region width, each the leaf springs being elongated in a second direction orthogonal to the first direction and having first and second sections and a slit formed between the first and second sections and extending along the second direction, the first section being fixed to said converging means;

first means for moving said converging means supported by said leaf springs;

means for guiding the light beam reflected from the information recording medium to said directing and detecting means;

means for supporting an arrangement of said converging means, said leaf springs, said guiding means and said first means movable along the first direction within at least a range corresponding to the width of the recording region; and second means for moving said supporting means.

According to the invention, there is also provided an optical apparatus provided with an optical means movable in a first direction along an information recording medium, comprising:

means for directing a light beam onto the information recording medium;

leaf springs for supporting said directing means movable along the first direction, each of the leaf springs being elongated in a second direction orthogonal to the first direction and having first and second sections and a slit formed between the first and second sections and extending along the second direction, the first section being fixed to said directing means;

first means for moving said directing means supported by said leaf springs;

means, movable along the first direction for supporting said directing means, said leaf springs and said first means; and second means for moving said supporting means.

According to the invention, there is further provided an optical apparatus provided with an optical means, movable along a recording region of information recording medium, the recording region having a predetermined width in a first direction, for converging a light beam on the recording region and detecting the light beam reflected from the recording region to reproduce an information recorded on the recording region, comprising:

means for directing the light beam onto the information recording medium which is fixed and detecting the light beam reflected from the information recording medium;

means for converging the light beam on the information recording medium;

first means for supporting said converging means movable along the first direction within a predetermined moving distance which is at least ½ of the recording region width;

second means for moving said converging means supported by said first means;

third means for supporting said converging means along the first direction within at least a range corresponding to the width of the recording region; and fourth means for moving said supporting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 5A and 5B are a perspective view and a plan view of a lens actuator shown in FIG. 3;

FIGS. 6A and 6B are a perspective view and a plan view of the lens actuator shown in FIG. 3 in operation;

FIGS. 10A to 10E are perspective views showing the supporting structure, the accessing/tracking coils and focusing coils which are deformed when the lens actuator is driven; and FIGS. 11A, 11B and 11C are graphs respectively illustrating the relationship between velocity v and time t with respect to the large-stroke distance L3, middle-stroke distance L2 and small-stroke distance L1, over which the optical system is moved by the apparatus shown in FIG. 3.

DETAILED DESCRIPTION OF THE PREFERRED EMBODIMENT

Figure 1:
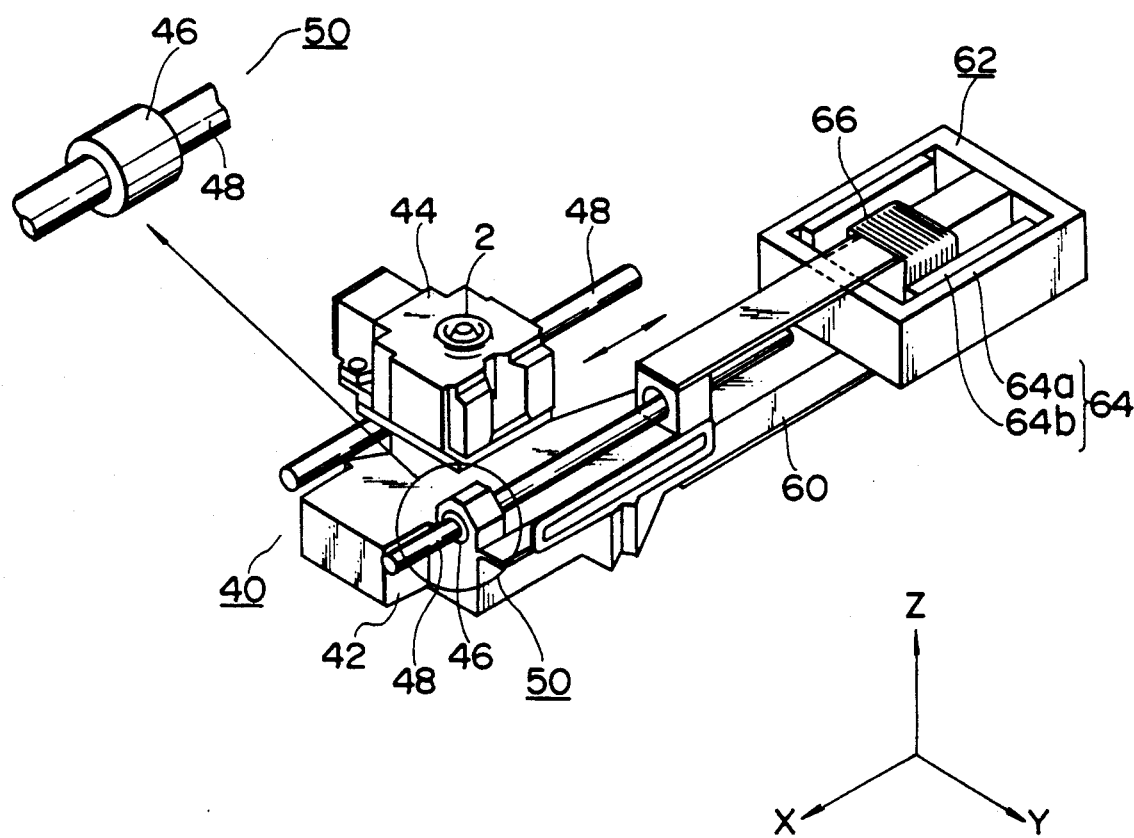
FIG. 1 is a partial perspective view schematically showing a conventional apparatus for moving an optical system.
Figure 2:
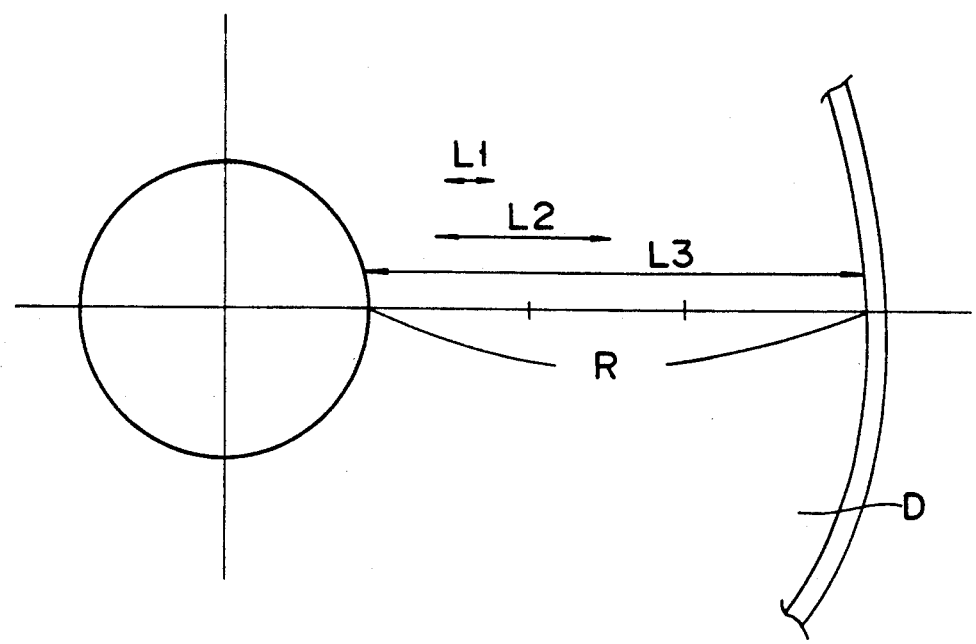
FIG. 2 is a schematic view showing stroke distances for access operation performed by the apparatus shown in FIG. 1.
Figure 3:
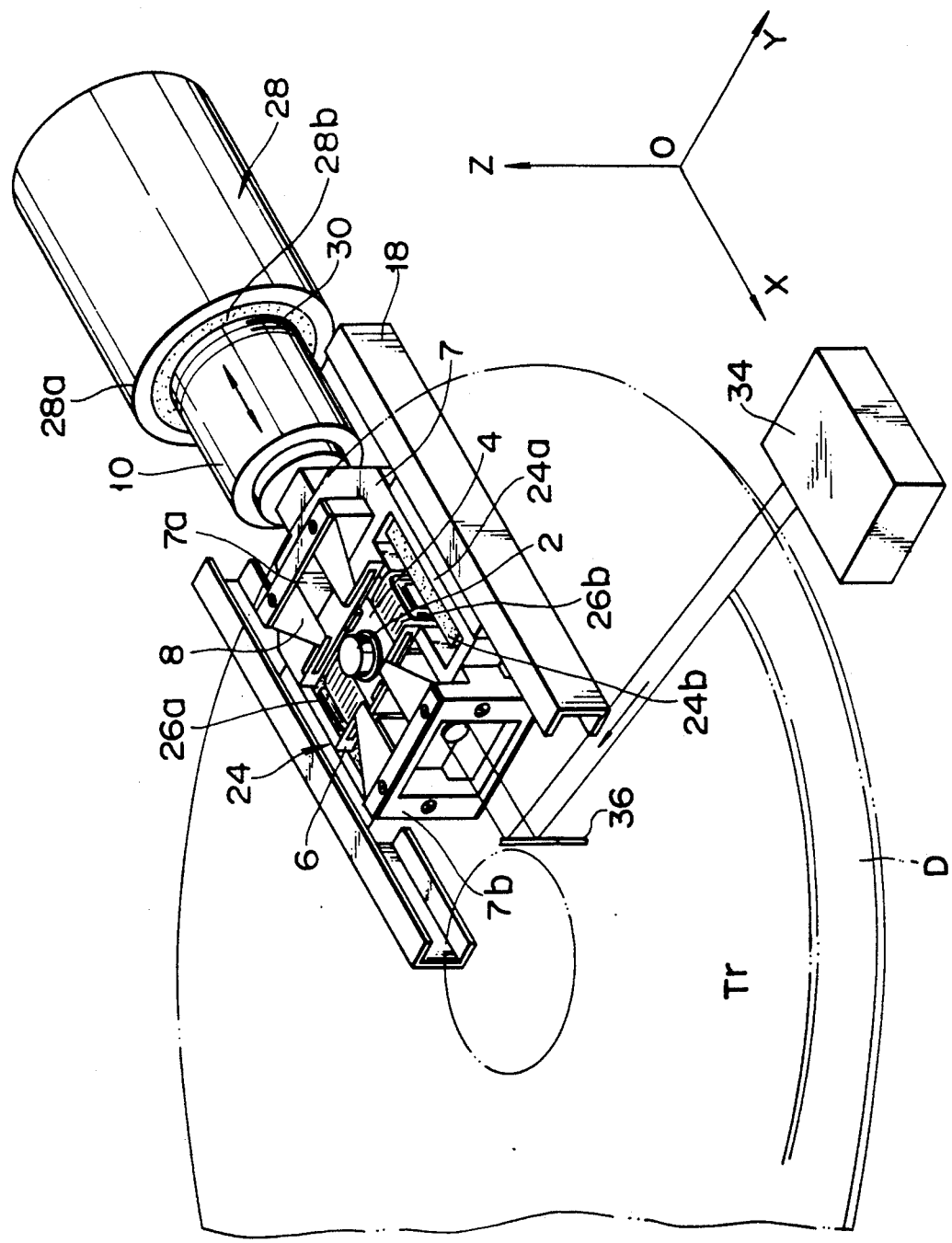
FIG. 3 is a perspective view schematically showing an apparatus for moving an optical system according to an embodiment of the present invention.
Figure 4A:
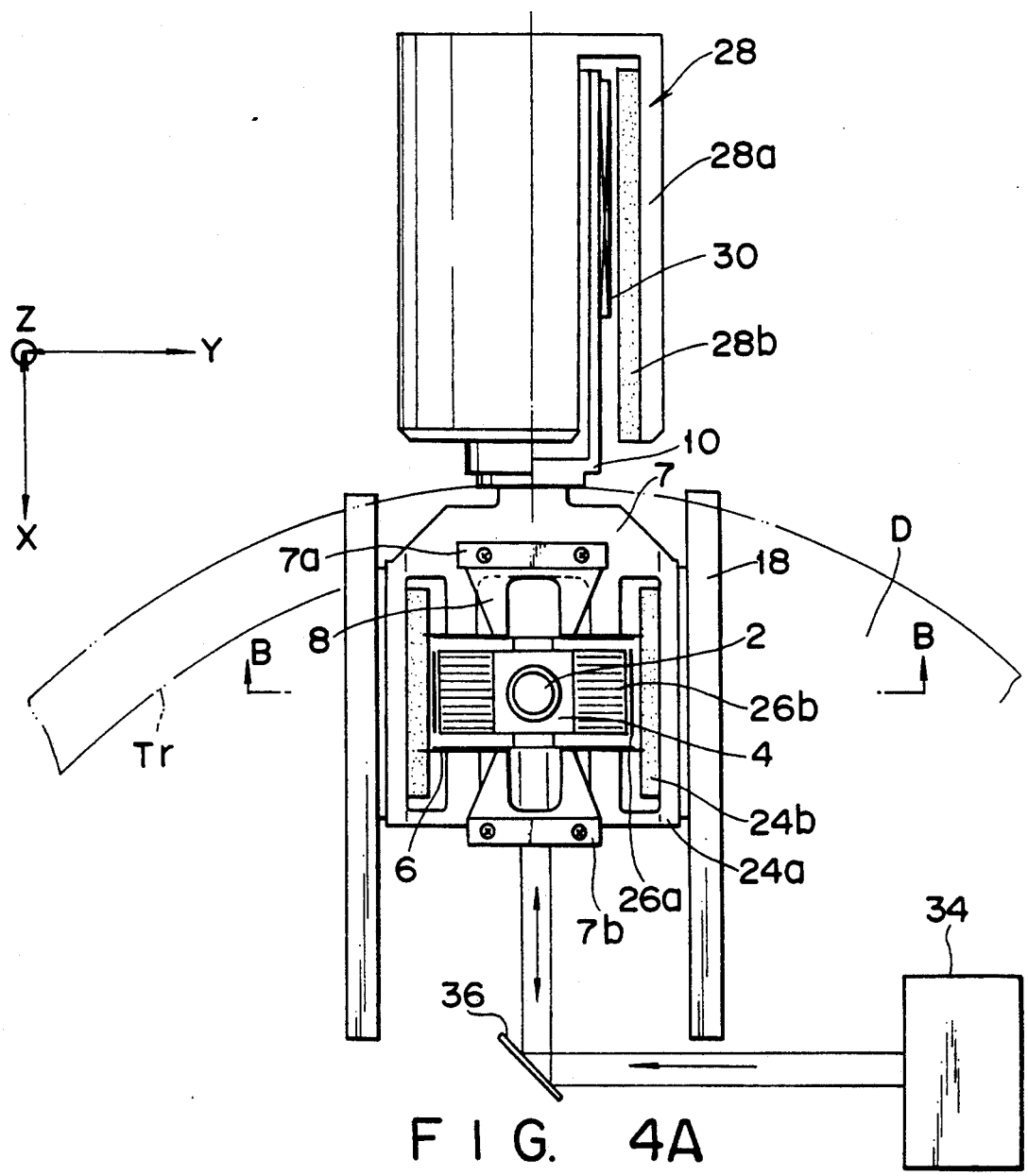
FIG. 4A is a plan view of the apparatus shown in FIG. 3.
Figure 4B:
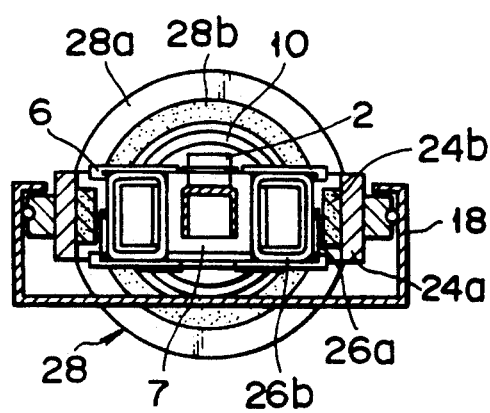
FIG. 4B is a cross-sectional view taken along line B—B in FIG. 4A.

FIG. 3 and FIGS. 4A and 4B schematically show an apparatus for moving an optical system according to an embodiment of the present invention. In this apparatus, an objective lens 2 is mounted on a lens support member 4. A tracking leaf spring 6 is fixed on each of both sides of the lens support member 4. The objective lens 2 is supported on a support frame 7 by means of the tracking leaf springs 6, so as to be movable along a line of access direction X, which is perpendicular to the optical axis of the objective lens 2 and perpendicular to a line along which a tracking guide Tr of an optical disc D extends, over a distance slightly greater than the middle-stroke distance L2 shown in FIG. 2. The tracking leaf springs 6 are secured to focusing leaf springs 8 coupled to fixing portions of the frame 7. The objective lens 2 is supported on the support frame 7 by means of the focusing leaf springs 8, so as to be movable along a line of focusing direction Z, which is parallel to the optical axis of the lens 2. The frame 7 is movably supported on a pair of slide rails 18 which allows the frame 7 to move only in the access direction X.

The support frame 7 is coupled to a bobbin 10 of a linear motor drive mechanism 28, which allows the frame 7 to move over a distance corresponding to the large-stroke distance shown in FIG. 2. In the linear motor drive mechanism 28, a linear motor coil 30 is wound around the bobbin 10. That part of the bobbin 10, around which the coil 30 is wound, is inserted into a cylindrical magnet 28a situated within a cylindrical yoke 28b. In the linear motor drive mechanism, the bobbin 10 is moved in the X-direction (access direction) by an interaction between the magnetic flux created by the cylindrical magnet 28b and the current flowing through the coil 30. The distance over which the bobbin 10 is moved is equal to the large-stroke distance L3 shown in FIG. 2, as has been mentioned above. In accordance with the movement of the bobbin 30, the support frame 7 is moved along the guide rails 18; thus, the objective lens 2 is moved in the radial direction of the optical disc D (i.e. access direction).

A pair of plate-like yokes 24a, which face each other, are fixed on the support frame 7 so as to extend along the guide rails 18. A pair of plate-like magnets 24b, which face each other, are fixed on the yokes 24a. A pair of tracking/accessing coils 26b are fixed on the lens support member 4, so as to face the magnets 24b. In addition, a focusing coil 26a is fixed on that portion of each coil 26b which faces the corresponding magnet 24b. The tracking/accessing coils 26b, focusing coils 26a, plate-like magnets 24b and yokes 24a constitute a magnetic circuit for moving the lens support member 4 in the focusing direction and in the accessing direction. Specifically, the accessing coils 26b, focusing coils 26a, plate-like magnets 24b and yokes 24a constitute a focusing magnetic circuit for moving the lens support member 4 in the focusing direction. A driving force for moving the objective lens 2 in the focusing direction is produced by an interaction between the electric current flowing through the focusing coils 26a and the magnetic flux generated by the magnets 24b. On the other hand, the tracking/accessing coils 26b, plate-like magnets 24b and yokes 24a constitute a magnetic circuit for moving the lens support member 4 in the focusing direction and in the accessing direction. A driving force for moving the objective lens 2 in the accessing direction is produced by an interaction between the electric current flowing through the coils 26b and the magnetic flux generated by the magnets 24b. At maximum, the objective lens 2 is moved in the accessing direction over a distance almost corresponding to the middle-stroke distance (e.g. about ⅓ of a second stroke or several pitches of the tracking guide). In addition, in this case, the objective lens 2 can be moved only slightly to trace the tracking guide.

While a movable optical system including the objective lens 2, etc. is mounted on the support frame 7 so that the movable optical system and the support frame 7 may be moved as one body, a stationary optical system is housed in a stationary optical unit 34. The stationary optical unit 34 is fixed on a chassis (not shown) situated outside the support frame 7. The stationary optical unit 34 contains a semiconductor laser light source, a collimator lens for collimating a laser beam, a detector, etc. A laser beam generated from the light source is collimated by the collimator lens, reflected by a deflecting mirror 36 situated outside the unit 34, and directed towards the support frame 7. In the support frame 7, the collimated beam is directed to the objective lens 2 by a total reflection prism or mirror fixed within the support frame 7. The beam is converged onto the optical disc D through the objective lens 2. The beam is reflected by the disc D and enters the objective lens 2 once again. The beam, which has passed through the lens 2, is reflected by the deflecting mirror 36, guided into the stationary optical unit 34, and detected by the detector. As is well known, a signal output from the detector is processed to reproduce information, and a focus signal and a tracking signal are generated.

Referring to FIGS. 5A, 5B, 6A, 6B, 7A, 7B, 8, 9 and 10A to 10E, a more detailed description will now be given of the tracking leaf springs 6, accessing/tracking magnetic circuit for driving the tracking leaf springs 6, focusing leaf springs 8, and focusing magnetic circuit for driving the focusing leaf springs 8.

FIGS. 5A and 5B show the state of the tracking leaf springs 6 and focusing leaf springs 8 to which no driving force is applied. As is obvious from FIG. 5A, each tracking leaf spring 6 has a slit extending in the Y-direction, a line of which intersects the line of the X-direction at right angles. The slit divides the leaf spring 6 into an upper section 6a and a lower section 6b. The upper section 6a and lower section 6b are coupled at their corresponding end portions. Mutually facing inner ends of the upper sections 6a are fixed at tip end portions of the focusing leaf spring. A central portion of the lower section 6b is fixed on the upper surface of the support frame 7 by means of a fixing element 20. As is shown in FIGS. 6A and 6B, the sections 6a and 6b of the tracking leaf spring 6 can be deformed in the accessing direction X. Thus, when a driving force is applied to the lens support member 4 to urge the member 4 in the accessing direction X, the lens support member 4 is moved in the direction X. The focusing leaf springs 8 have bases 8c fixed on leaf spring fixing elements 7a and 7b. The tracking leaf spring 6 is fixed at tip portions of leaf spring sections 8a extending from the base 8c in the accessing direction and being capable of deforming in the focusing direction. Thus, when a driving force in the focusing direction Z acts on the lens support member 4, the lens support member 4 is moved in the focusing direction Z.

Figure 7A:
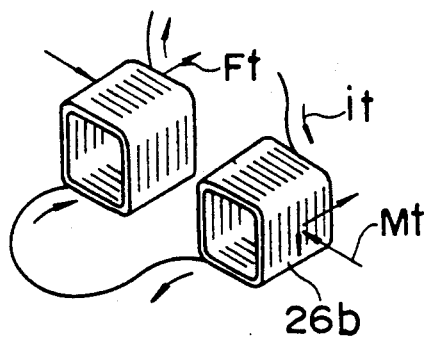
FIGS. 7A and 7B are perspective views showing accessing/tracking coils and focusing coils shown in FIG. 3.
Figure 7B:
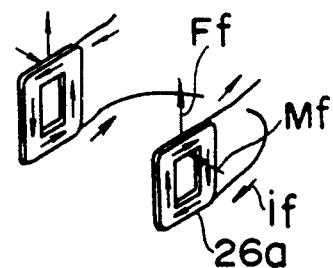
Figure 8:
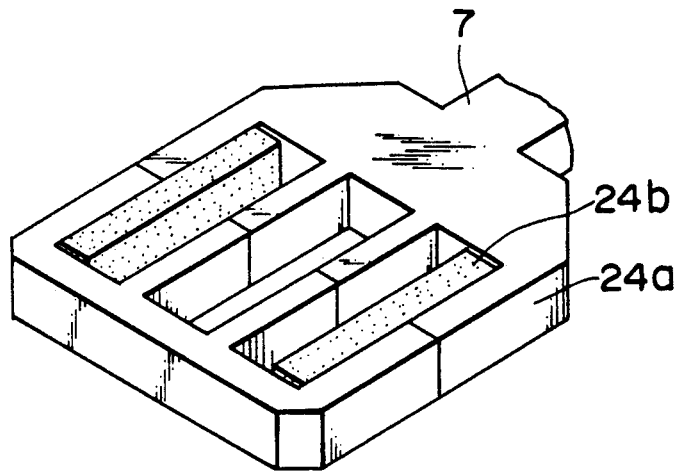
FIGS. 8 and 9 are a perspective view and a partial cross-sectional view showing a magnetic circuit of the lens actuator.
Figure 9:
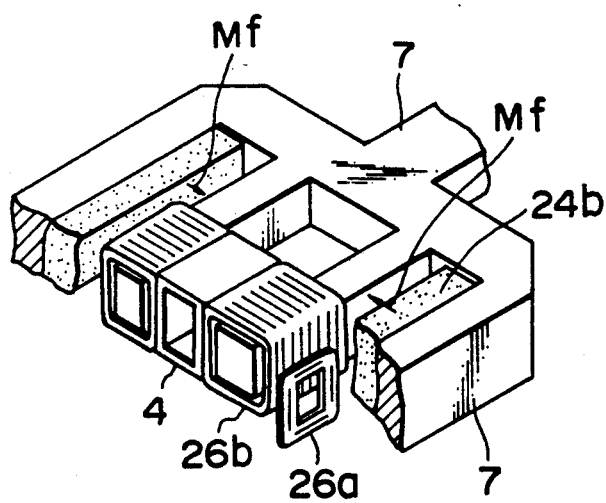

As is shown in FIG. 7B, each focusing coil 26a is formed by winding a conductor wire about an axis extending in the Y-direction. On the other hand, as is shown in FIG. 7A, each tracking/accessing coil 26b is formed by winding a conductor wire about an axis extending in the accessing direction X. Part of the support frame 7 forms yokes 24a, as shown in FIG. 8, and permanent magnets 24b are mounted within the support frame 7, as has already been mentioned. The support frame 7 comprises two blocks which are coupled to each other. Before the blocks are coupled, as is shown in FIG. 9, the tracking/accessing coils 26b fixed on the lens support member 4 and having focusing coils 26a on their end faces are mounted on the bridges of the support frame 7. Thus, the tracking/accessing coils 26b and focusing coils 26a are arranged to face the permanent magnets 24b. Accordingly, as shown in FIGS. 7A and 7B, magnetic flux Mf which intersects the coils 26a and 26b at right angles is generated from the permanent magnets 24b. In accordance with the direction of current if supplied to the coils 26, a driving force acting in the direction of arrow Ff or in the reverse direction is applied to the coils 26a. In addition, in accordance with the direction of current it supplied to the coils 26b, a driving force acting in the direction of arrow Ft or in the reverse direction is applied to the coils 26b. FIG. 10A shows the coils 26a to which no driving force is applied, that is, the leaf springs 8 are not deformed. In response to a focus signal, the leaf springs 8 are deformed, as shown in FIG. 10B or 10C, whereby the objective lens 2 is always kept in the focused state. As is shown in FIG. 10B, driving force Ff for urging the objective lens 2 towards the optical disc D is applied to the coils 26a in response to the focusing signal. Thus, the leaf spring 8 is bent upwards. Alternatively, as is shown in FIG. 10C, driving force Ff for urging the objective lens 2 away from the optical disc D is applied to the coils 26a in response to the focusing signal. Thus, the leaf spring 8 is bent downwards. In the state shown in FIG. 10A, no driving force is applied to the coils 26b and the leaf springs 6 are not deformed. In response to a tracking signal, the leaf springs 6 are bent, as shown in FIG. 10D or 10E, whereby the objective lens 2 is always kept in the tracking state. Also, in response to an access signal, the leaf springs 6a, 6b are bent, as shown in FIG. 10D or 10E, whereby the objective lens 2 is moved within the range of the middle-stroke distance and a desired tracking guide is accessed. Specifically, as shown in FIG. 10D, in response to the tracking signal, driving force Ft for urging the objective lens 2 towards the center of the optical disc D is applied to the coils 26b, thereby bending the leaf springs 6a, 6b towards the center of the disc D. Alternatively, as shown in FIG. 10E, in response to the tracking signal, driving force Ft for urging the objective lens 2 towards the periphery of the optical disc D is applied to the coils 26b, thereby bending the leaf springs 6a, 6b towards the periphery of the disc D.

FIGS. 11A, 11B and 11C are graphs respectively illustrating the relationship between velocity v and time t with respect to the large-stroke distance L3, middle-stroke distance L2 and small-stroke distance L1, over which the optical system is moved by the apparatus shown in FIG. 3. As has been described above, the access operation over the large-stroke distance L3 is performed by the linear actuator 28, and the access operation over the middle- and small-stroke distances L2 and L1 is carried out by the lens actuator system, as shown in FIGS. 10A to 10E. Since the weight of the lens support member 4 driven by the lens actuator system is relatively light, the drive acceleration for the middle-stroke distance L2 can be increased, as illustrated in the time chart of FIG. 11B. Thus, the seek time for the middle-stroke distance L2, which is accessed most frequently, can be shortened.

In the above-described embodiment, an optical medium to be accessed is not limited to the optical disc. A photomagnetic disc, an optical card, a photomagnetic card, etc. may be used.

As has been described above, according to the optical system moving apparatus of this invention, the seek time for the middle-stroke distance, which is accessed most frequently, can be shortened; therefore, an average access time in the access operation can be decreased.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical apparatus for reading an optical disk having a recording region, the optical apparatus being provided with an optical head means, movable along the optical disk in a first direction parallel with a radial direction of the optical disk within a predetermined range of movement corresponding to the width of the recording region, for converging a light beam on the optical disk and detecting the light beam reflected from the optical disk to reproduce an information recorded on the optical disk, comprising:

means fixedly disposed for directing the light beam onto the optical disk and detecting the light beam reflected from the optical disk;

means for converging the light beam on the optical disk;

first leaf springs for supporting said converging means and movable along the radial direction of the optical disk within a predetermined distance which is equal to about ½ of the predetermined range of movement of the optical head means, each of the first leaf springs being elongated in a second direction orthogonal to the first direction and having first and second sections and a slit formed between the first and second sections and extending along the second direction, the first section being fixed to said converging means;

first means for moving said converging means supported by said first leaf springs;

means for guiding the light beam reflected from the optical disk to said directing and detecting means;

means for supporting an arrangement of said converging means, said first leaf springs, said guiding means and said first moving means, said supporting means movable along the radial direction of the optical disk within the predetermined range of movement of the optical head means and including second leaf springs, each of said first leaf springs being coupled to a corresponding one of said second leaf springs; and second means for moving said supporting means.

2. An optical apparatus for reading an optical disk having a recording region, the optical apparatus being provided with an optical head means, movable along the optical disk in a first direction parallel with a radial direction of the optical disk within a predetermined range of movement corresponding to the width of the recording region, for converging a light beam on the optical disk and detecting the light beam reflected from the optical disk to reproduce an information recorded on the optical disk, comprising:

means fixedly disposed for directing the light beam onto the optical disk and detecting the light beam reflected from the optical disk;

means for converging the light beam on the optical disk;

first means for supporting said converging means and including first leaf springs movable along the radial direction of the optical disk within a predetermined distance which is equal to about ½ of the predetermined range of movement of the optical head means;

first means for moving said converging means supported by said first supporting means;

second means for supporting said converging means and movable along the radial direction of the optical disk within at least a range corresponding to the predetermined range of movement of the optical head means, said second supporting means including second leaf springs, each of said first leaf springs being coupled to a corresponding one of said second leaf springs; and second means for moving said second supporting means.

* * * * *